(12) United States Patent
Shiota et al.

(10) Patent No.: US 7,898,733 B2
(45) Date of Patent: Mar. 1, 2011

(54) LASER OSCILLATOR

(75) Inventors: Kazunori Shiota, Tokyo (JP); Shin Masuda, Tokyo (JP); Masataka Nakazawa, Miyagi (JP); Masato Yoshida, Miyagi (JP)

(73) Assignees: Advantest Corporation, Tokyo (JP); National University Corporation Tohoku University, Miyagi (JP)

( * ) Notice: Subject to any disclaimer, the term of this patent is extended or adjusted under 35 U.S.C. 154(b) by 141 days.

(21) Appl. No.: 12/422,758

(22) Filed: Apr. 13, 2009

(65) Prior Publication Data

US 2010/0067100 A1 Mar. 18, 2010

Related U.S. Application Data

(62) Division of application No. 11/657,410, filed on Jan. 24, 2007, now Pat. No. 7,602,546.

(30) Foreign Application Priority Data

Jan. 26, 2006 (JP) .............................. 2006-017532
Jan. 22, 2007 (JP) .............................. 2007-011620

(51) Int. Cl.
*H04B 10/17* (2006.01)
*H01S 3/00* (2006.01)

(52) U.S. Cl. .......................... 359/341.1; 359/347; 372/6

(58) Field of Classification Search ..................... 372/6; 359/341.1, 347
See application file for complete search history.

(56) References Cited

U.S. PATENT DOCUMENTS

| | | | | |
|---|---|---|---|---|
| 5,822,113 A | * | 10/1998 | Delavaux et al. | ......... 359/341.3 |
| 6,049,415 A | * | 4/2000 | Grubb et al. | ............. 359/341.1 |
| H001926 H | * | 12/2000 | Carruthers et al. | ............. 372/6 |
| 6,185,230 B1 | * | 2/2001 | Waarts | ........................... 372/6 |
| 6,570,893 B1 | * | 5/2003 | Libatique et al. | .............. 372/20 |
| 6,845,108 B1 | * | 1/2005 | Liu et al. | ...................... 372/20 |
| 2001/0024318 A1 | * | 9/2001 | Atieh | ...................... 359/341.1 |

(Continued)

FOREIGN PATENT DOCUMENTS

JP     2006080384 A   *   3/2006

OTHER PUBLICATIONS

Jhon et al., "Single-frequency and single polarization Er3+-doped fiber ring laser with less than 0.7 kHz linewidth", The Pacific Rim Conference on Lasers and Electro-optics, vol. 1 pp. 23-24, 1999.*

*Primary Examiner*—Eric Bolda
(74) *Attorney, Agent, or Firm*—Osha • Liang LLP

(57) ABSTRACT

A laser oscillator includes a ring resonator. The ring resonator includes an optical circulator having first, second, third, and fourth ports and a first optical amplification fiber connected to the optical circulator. Light incident on the first port is exited from the second port, and light incident on the second port is exited from the third port. The fourth port provides an exciting light and injects the exciting light into the ring resonator through the first port. The first optical amplification fiber amplifies light exited from the third port with the exciting light provided by the fourth port. The laser oscillator also includes an optical member connected to the optical circulator. The optical member reflects at least a part of the light exited from the second port and injects the same into the second port again.

7 Claims, 11 Drawing Sheets

U.S. PATENT DOCUMENTS

2002/0176451 A1* 11/2002 Lee et al. .................. 372/6
2003/0142393 A1* 7/2003 Kuksenkov .............. 359/341.1
2006/0193352 A1* 8/2006 Chong et al. .................. 372/6

* cited by examiner

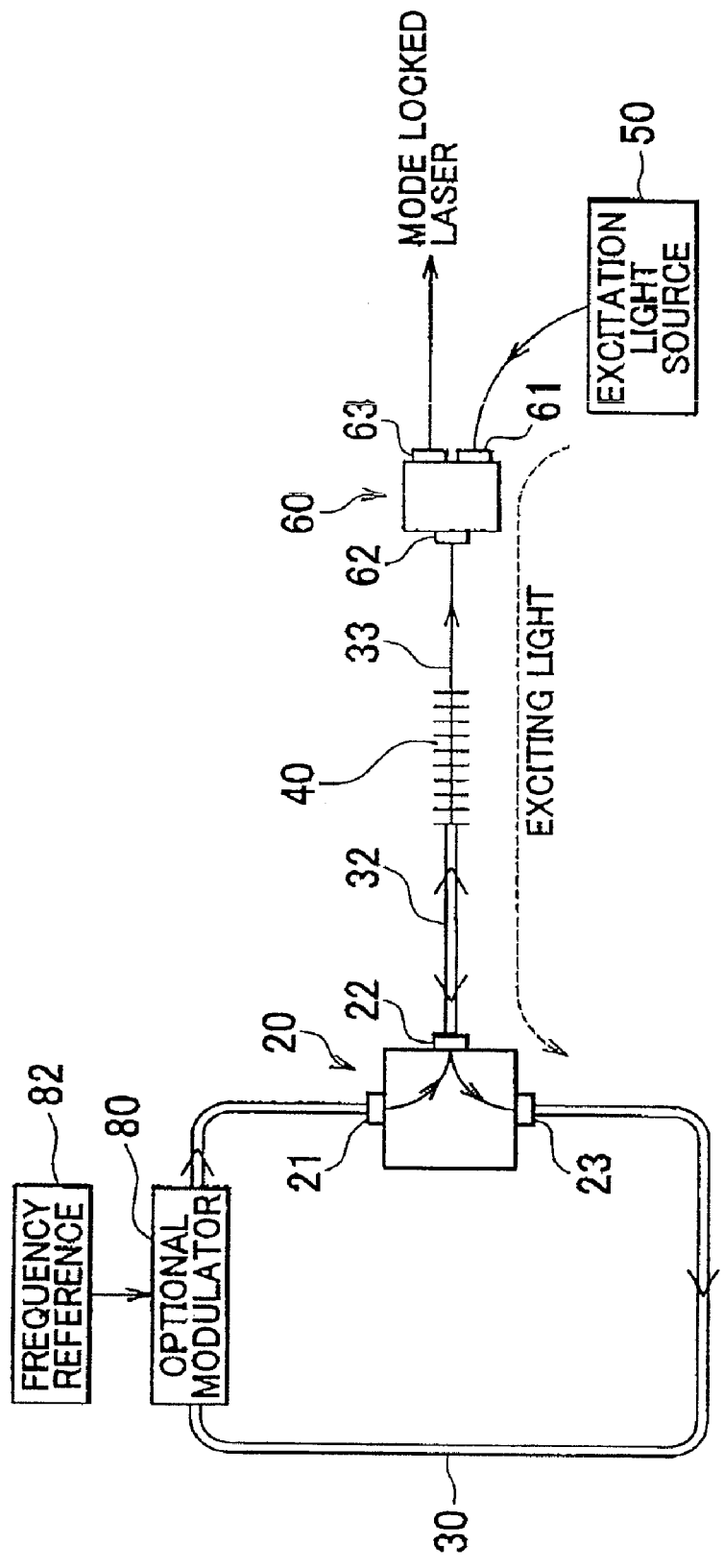
F I G. 6

LASER OSCILLATOR

CROSS REFERENCE TO RELATED APPLICATION

This patent application is a divisional application of, and claims benefit from, U.S. patent application Ser. No. 11/657,410, filed on Jan. 24, 2007. The present application claims priority from a Japanese Patent Applications No. 2006-017532 filed on Jan. 26, 2006 and No. 2007-011620 filed on Jan. 22, 2007, the contents of which are incorporated herein by reference.

BACKGROUND OF THE INVENTION

1. Field of the invention

The present invention relates to a laser oscillator. Particularly, the present invention relates to a laser oscillator using an optical fiber which is excited by light as a gain medium.

2. Related art

Generally, an optical fiber laser oscillator using an optical amplification fiber which is excited by light as a gain medium has been known as, for example, in Japanese Patent Application Publication No. 9-64440.

FIG. 11 shows a configuration of a conventional optical fiber laser oscillator 700. The optical fiber laser oscillator 700 includes: a optical circulator 710 in which light incident on a first port 711 is exited from a second port 712, and light incident n the second port 712 is exited from a third port 713; an EDF 720 being an optical fiber containing erbium (Er); a fiber Bragg grating (FBG) 730 that reflects light with a predetermined wavelength among the light exited from the second port 712 and injects the same into the second port 712 again, an excitation light source 740 that generates an exciting light to excite the EDF 720 and an optical coupler 750.

The EDF 720 amplifies the light exited from the third port of the optical circulator 710 and injects the same into the first port 711. The optical coupler 750 is inserted into a path between the third port 713 and the first port 711 of the optical circulator 710 and injects the exciting light outputted form the excitation light source 740 to the EDF 720.

In such conventional light fiber laser oscillator 700, a loop optical path formed by the optical circulator 710, the EDF 720, the FBG 730 and the optical coupler 750 includes a resonator for a laser oscillation. Thereby the optical fiber laser oscillator 700 can output the light oscillated by the laser from the FBG 730.

Meanwhile, when the laser according to the present invention is used for a light source for optical communication, it is required that the laser is oscillated in a single mode and the mode is not further hopped. However, the laser oscillation mode of the optical fiber laser oscillator 700 is easily changed, i.e. so-called mode hopping is easily generated because of any effect of temperature change. In the case of a ring fiber laser, the laser oscillated in a single mode oscillates in a mode(m) in which a gain in the resonator is maximized among modes which satisfy the following formula 11.

$$F = m \cdot FSR \qquad 11,$$

where m is integer, FSR(Free Spectrum Range:longitudinal mode interval)=c/Nl, where c is light velocity, n is refractive index of optical fiber and L is cavity length The oscillation frequency of the laser is changed dependent on the temperature change δT, and the amount of change δf is obtained by the following formula 12.

$$\delta f = (\alpha + \beta) \delta T \times f \qquad 12,$$

where α is linear thermal expansion coefficient and β is the temperature dependency of the refractive index The oscillation frequency is changed dependent on the temperature change according to the formula 12. Then, when the oscillation frequency is arrived at a certain position by the FSR, the mode in which the gain is maximized is changed, so that the mode is hopped.

Here, if the cavity length of the laser is increased, the longitudinal mode interval FSR is reduced. Then, if the longitudinal mode interval FSR is reduced, the oscillation frequency of the laser could be changed by the FSR even if the temperature is changed a little, i.e. the mode is hopped. In the conventional optical fiber laser oscillator 700, the cavity length is several meters, so that the mode is hopped even if the temperature is changed by about 0.01 degree centigrade and is it not stable when the temperature is changed.

Thus, the advantage of the present invention is to provide a laser oscillator which is capable of solving the problem accompanying the conventional art. The above and other advantages can be achieved by combining the features recited in independent claims. Then, dependent claims define further effective specific example of the present invention.

SUMMARY

In order to solve the above described problems, a first aspect of the present invention provides a laser oscillator. The laser oscillator includes: an optical circulator in which light incident on a first port is exited from a second port and light incident on the second port is exited from a third port; a first optical amplification fiber that amplifies the light exited from the third port because of being excited by an exciting light and injects the same into the first port; a reflective light filter that reflects light with a predetermined wavelength among the light exited from the second port and injects the same into the second port again; an excitation light source that generates an exciting light to excite the first optical amplification fiber; and an exciting light provision section that provides the exciting light. The exciting light provision section injects the exciting light into a ring resonator through the reflective light filter from the outside of the ring resonator.

The laser oscillator may further include a second optical amplification fiber disposed between the second port of the optical circulator and the reflective light filter that amplifies the light propagated between the second port and the reflective light filter. The reflective light filter may have an optical amplification fiber that amplifies the light propagated therethrough.

A second aspect of the present invention provides a laser oscillator. The laser oscillator includes: an optical circulator in which light incident on a first port is exited from the second port, light incident on the second port is exited from a third port, and light incident on a fourth port is exited from the first port; a first optical amplification fiber that amplifies the light exited from the third port because of being excited with an exciting light and injects the same into the first port; a reflective light filter that reflects light with a predetermined wavelength among the light exited from the second port and injects the same into the second port again; and an excitation light source that generates an exciting light to excite the first optical amplification fiber. The excitation light source injects the exciting light from the fourth port into a ring resonator.

A third aspect of the present invention provides a laser oscillator. The laser oscillator includes: an optical circulator in which light incident on a first port is exited from the second port, light incident on the second port is exited from a third port, and light incident on a fourth port is exited from the first port; a first optical amplification fiber that amplifies the light exited from the third port because of being excited by an exciting light and injects the same into the first port; a saturable absorption mirror that changes a reflective index dependent on the intensity of the light exited from the second port and injects the same into the second port again; and an excitation light source that generates an exciting light to excite the first optical amplification fiber. The excitation light source injects the exciting light from the fourth port into a ring resonator.

A fourth aspect of the present invention provides a laser oscillator. The laser oscillator includes: an optical circulator in which light incident on a first port is exited from a second port and light incident on the second port is exited from a third port; a first optical amplification fiber that amplifies the light exited from the third port because of being excited by an exciting light and injects the same into the first port; a saturable absorption mirror that changes a reflective index dependent on the intensity of the light exited from the second port and injects the same into the second port again; an excitation light source that generates an exciting light to excite the first optical amplification fiber; and an exciting light provision section that provides the exciting light. The exciting light provision section injects the exciting light into a ring resonator through the reflective light filter from the outside of the ring resonator.

A fifth aspect of the present invention provides a laser oscillator. The laser oscillator includes: an optical circulator in which light incident on a first port is exited from the second port, light incident on the second port is exited from a third port, and light incident on a fourth port is exited from the first port; a first optical amplification fiber that amplifies the light exited from the third port because of being excited by an exciting light and injects the same into the first port; an optical modulator that modulates the intensity of light propagated through the first optical modification filter based on a frequency reference; a reflective light filter that reflects light with a predetermined wavelength among the light exited from the second port and injects the same into the second port again; and an excitation light source that generates an exciting light to excite the first optical amplification fiber. The excitation light source injects the exciting light from the fourth port into a ring resonator.

A sixth aspect of the present invention provides a laser oscillator. The laser oscillator includes: an optical circulator in which light incident on a first port is exited from a second port and light incident on the second port is exited from a third port; a first optical amplification fiber that amplifies the light exited from the third port because of being excited by an exciting light and injects the same into the first port; an optical modulator that modulates the intensity of light propagated through the first optical modification filter based on a frequency reference; a reflective light filter that reflects light with a predetermined wavelength among the light exited from the second port and injects the same into the second port again; an excitation light source that generates an exciting light to excite the first optical amplification fiber; and an exciting light provision section that provides the exciting light. The exciting light provision section injects the exciting light into a ring resonator through the reflective light filter from the outside of the ring resonator.

Here, all necessary features of the present invention are not listed in the summary of the invention. The sub-combinations of the features may become the invention.

BRIEF DESCRIPTION OF THE DRAWINGS

FIG. 6 shows a configuration of a first mode locked laser oscillator 301 according to a modification of the embodiment;

DESCRIPTION OF EXEMPLARY EMBODIMENTS

Hereinafter, the present invention will now be described through preferred embodiments. The embodiments do not limit the invention according to claims and all combinations of the features described in the embodiments are not necessarily essential to means for solving the problems of the invention.

Figure 1:
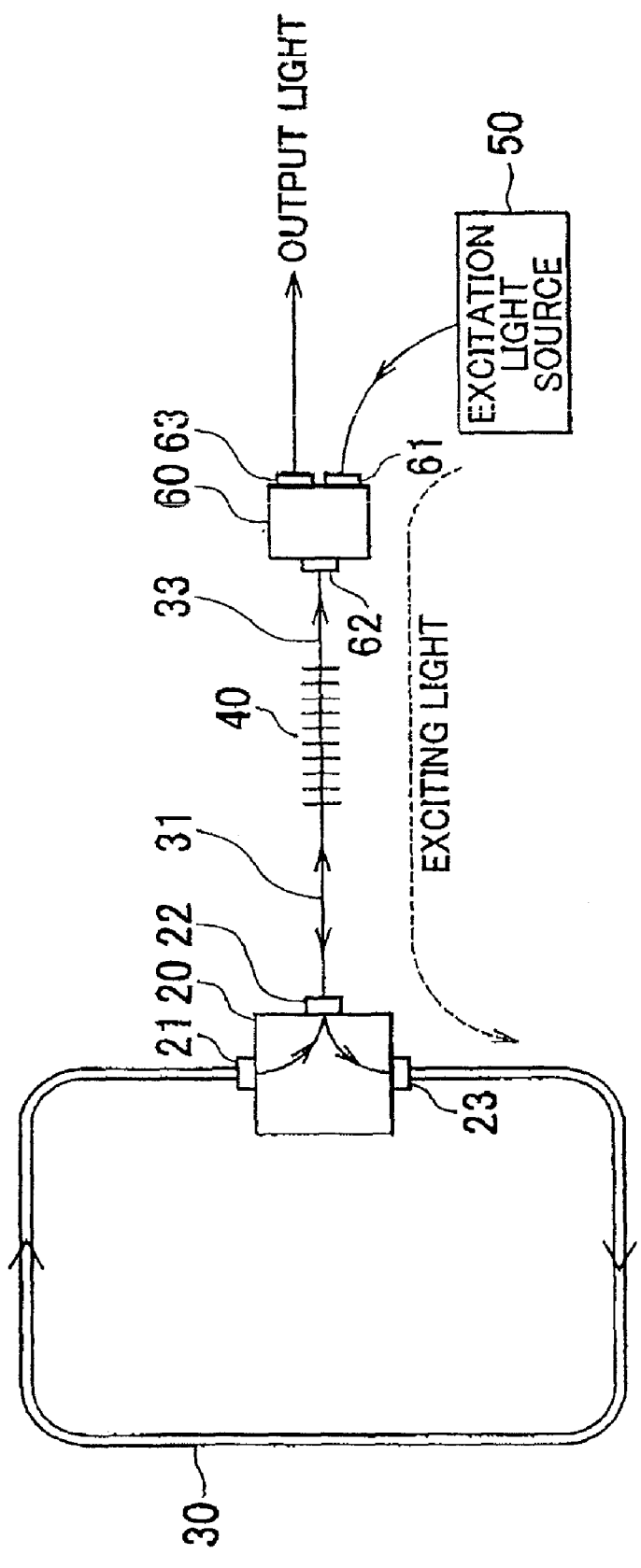
FIG. 1 shows a configuration of a first laser oscillator 100 according to an embodiment.

FIG. 1 shows a configuration of a first laser oscillator 100 according to an embodiment. The first laser oscillator 100 outputs an stable laser light in the laser oscillator using an optical fiber excited by light as a gain medium by reducing loss and shortening the path.

The first laser oscillator 100 includes an optical circulator 20, a rare-earth optical fiber 30, a reflective light filter 40, an excitation light source 50 and an exciting/output light incident and exit section 60.

The optical circulator 20 includes a first port 21, a second port 22 and a third port 23 each of which is a light incident/exit port. In the optical circulator 20, light incident on the first port 21 is exited form the second port 22, and light incident on the second port is exited from the third port 23. The optical circulator 20 is an example of directional coupler.

The rare-earth optical fiber 30 is an optical fiber which contains rare earth ion such as erbium (Er) or neodymium (Nd) and amplifies light propagated therethrough because of being excited by an exciting light. Specifically, when the exciting light is injected into the rear-earth optical fiber 30, the rear-earth ion contained in the rear-earth optical fiber 30 absorbs the energy of the exciting light and activates. When a signal light is passed through the rare-earth optical fiber 30, the activated rare-earth element is resonated, so that the rear-earth optical fiber 30 outputs light the same as the signal light. Therefore, the rear-earth optical fiber 30 can amplify the signal light passed therethrough and output the same. The rear-earth optical fiber 30 is an example of first optical amplification fiber according to the present invention.

One end of the rear-earth optical fiber 30 is connected to the first port 21 of the optical circulator 20 and the other end of that is connected to the third port 23 of the optical circulator 20. Accordingly, the rear-earth optical fiber 30 amplifies the light exited from the third port 23 and injects the same into the first port 21. Here, the rear-earth optical fiber 30 may amplify through all, the optical path from the third port 23 to the first port 21, or may amplify the light through only a part of the optical path.

The reflective filter 40 reflects the light with a predetermined wavelength among the light exited from the second port 22, injects the same into the second port 22 again and transmits the light with the wave length other than the predetermined that. Additionally, when the intensity of the light with the predetermined wavelength is more than a certain level due to an oscillation, the reflective light filter 40 transmits the light with the intensity more than the certain level. The reflective light filter 40 includes such as a fiber Bragg grating (FBG) and a dielectric multilayer light filter.

The excitation light source 50 generates an exciting light to excite the rear-earth optical fiber 30. That is, the excitation light source 50 generates light with a predetermined wavelength to activate rear-earth ion contained in the rear-earth optical fiber 30. The excitation light source 50 includes such as laser diodes.

The exciting/output light incident and exit section 60 includes an exciting light incident port 61, a common port 62 and an output light exit port 63 each of which is a light incident and exit port. The exciting light incident port 61 injects the exciting light generated by the excitation light source 50. The common port 62 injects the light outputted from the reflective light filter 40, emits the exciting light incident on the exciting light incident port 61 and injects the emitted exciting light into the second port 22 of the optical circulator 20 through the reflective light filter 40. The output light exit port 63 emits the light incident on the common port 62. The exciting/output light incident and exit section 60 is an example of exciting light provision section according to the present invention.

In the first laser oscillator 100 as described above, a resonator which is a basic element for a laser oscillation is formed by a loop optical path including the optical circulator 20, the rear-earth optical fiber 30 and the reflective light filter 40. Specifically, the loop path through which the light reflected from the reflective light filter 40 passes through sequentially the second port 22 and the third port 23 of the optical circulator 20, the rear-earth optical fiber 30, the first port 21 and the second port 22, and returns to the reflective light filter 40 forms a ring resonator. Further, in the first laser oscillator 100, the rear-earth optical fiber 30 includes a gain medium which is a basic element for a laser oscillation, and the excitation light source 50 includes an excitation source which is a basic element for a laser oscillation.

As described above, the first laser oscillator 100 has the gain medium, the resonator and the excitation source which are all basic elements for a laser oscillation, so that the laser oscillation can be performed within the resonator. Then, the first laser oscillator 100 passes the light oscillated by the laser in the resonator through the reflective light filter 40 and outputs the same as an output light.

Here, the exciting/output light incident and exit section 60 injects an exciting light from the port other than the first port 21 and the third port 23 of the optical circulator 20 to the rear-earth optical fiber 30. That is, the exciting/output light incident and exit section 60 being an example of exciting light provision section according to the present invention is provided in the first laser oscillator 100 outside of the path of the ring resonator. Specifically, the exciting/output light incident and exit section 60 injects an exciting light to the rare-earth optical fiber 30 through the third port 23 by injecting the exciting light from the output end side of the reflective light filter 40 to the second port 22 of the optical circulator 20.

As described above, the exciting light provision section is provided outside of the path of the ring resonator in the first laser oscillator 100. Therefore, the number of components in the resonator can be reduced and the optical loss therein can be reduced. Accordingly, the first laser oscillator 100 can reduce the laser oscillation threshold value and also reduce the length of the rear-earth optical fiber 30 required for an oscillation. Additionally, the first laser oscillator 100 does not need such as an optical coupler to inject an exciting light from the resonator thereby the length of the optical path of the resonator can be reduced. Therefore, the first laser oscillator 100 can achieve an effect that the longitudinal mode interval is extended, the mode hopping is reduced and a stable laser light can be outputted.

Here, it is preferred that members such as the rear-earth optical fiber 30, the reflective filter 40, the exciting/output light incident and exit section 60 which consist a resonator are polarization maintaining type. By using the polarization maintaining type of the optical circulator 20 and the exciting/output light incident and exit section 60, light with one polarization can be outputted. Therefore, the oscillation is performed in a single polarization mode and also an optical intensity is stabilized.

Figure 2:
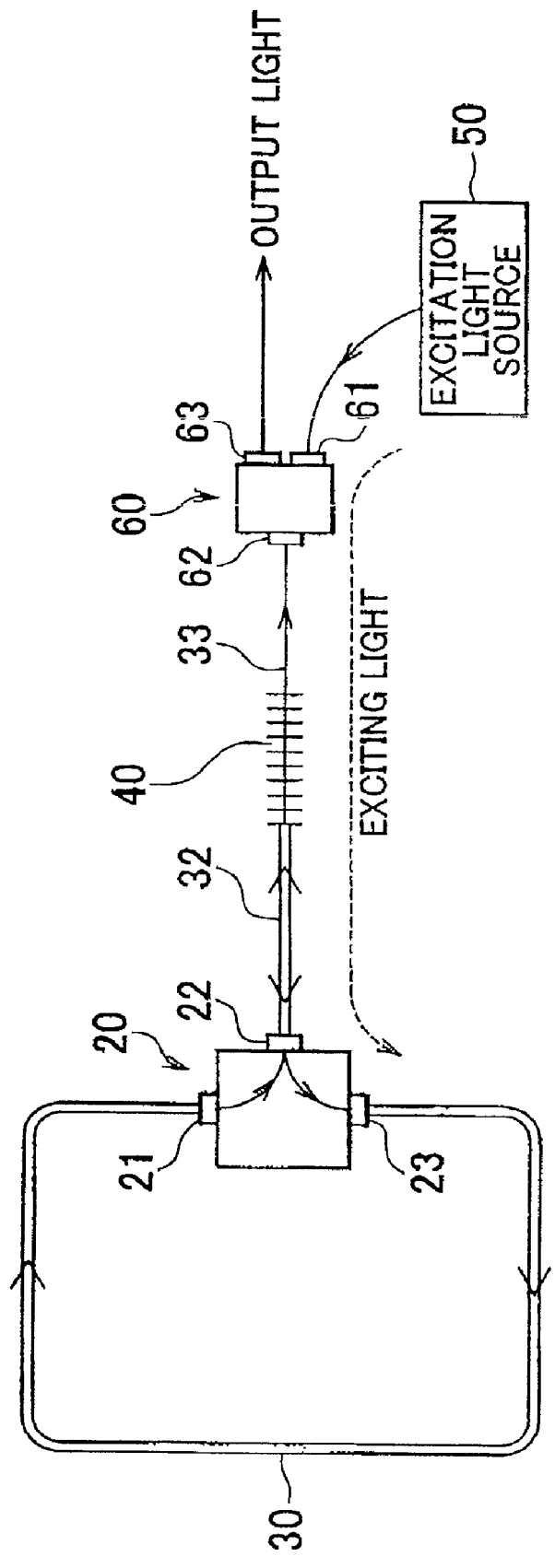
FIG. 2 shows a configuration of a first laser oscillator 101 according to a modification of the embodiment.

FIG. 2 shows a configuration of a first laser oscillator 101 according to a modification of the present embodiment. The first laser oscillator 101 may further include a second rear-earth optical fiber 32 which is provided between the second port 22 of the optical circulator 20 and the reflective light filter 40 and amplifies light propagated between the second port 22 and the refractive light filter 40. The second rear-earth optical fiber 32 is an example of the second optical amplification fiber according to the present invention. An optical path between the second port 22 of the optical circulator 20 and the reflective light filter 40 is a path through which an exciting light passes and is included in the path of the resonator. That is, the second rear-earth optical fiber 32 contributes to amplify a laser oscillation. Therefore, the first laser oscillator 101 further include the second rear-earth optical fiber 32, so that the amplification degree by the gain medium for a laser oscillation can be increased.

Figure 3:
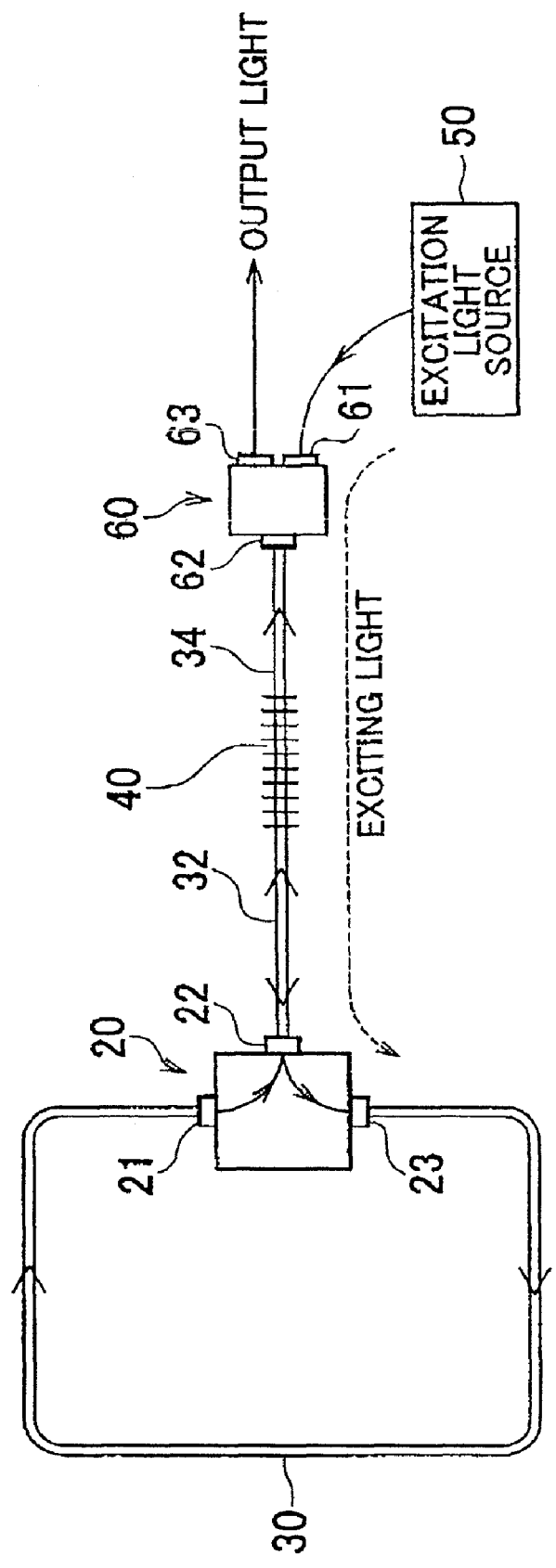
FIG. 3 shows a configuration of a first laser oscillator 102 according to another modification of the first laser oscillator 100.

FIG. 3 shows a configuration of a first laser oscillator 102 according to another modification of the present embodiment. The first laser oscillation 102 may further include a third rare-earth optical fiber 34 which is provided between the reflective filter 40 and a common port 62 of an exciting/output light incident and exit section 60 and amplifies an output light propagated from the reflective light filter 40 to the common port 62. The third rear-earth optical fiber 34 is an example of the third optical amplification fiber. An optical path between the reflective light filter 40 and the common port 62 of the exciting/output light incident and exit section 60 is a path through which an exciting light passes and is included in an output path from which the output light is outputted. That is, the third rear-earth optical fiber 34 contributes to amplify the output light. Accordingly, the first laser oscillator 100 can more amplify the output light and output the same because of having the third rear-earth optical fiber 34.

Additionally, the first laser oscillator 100 may use a reflective light filter 40 including a rear-earth optical fiber. Thereby the first laser oscillator 100 can increase the amplification degree by the gain medium for an laser oscillation and amplify the output light oscillated by the laser.

Figure 4:
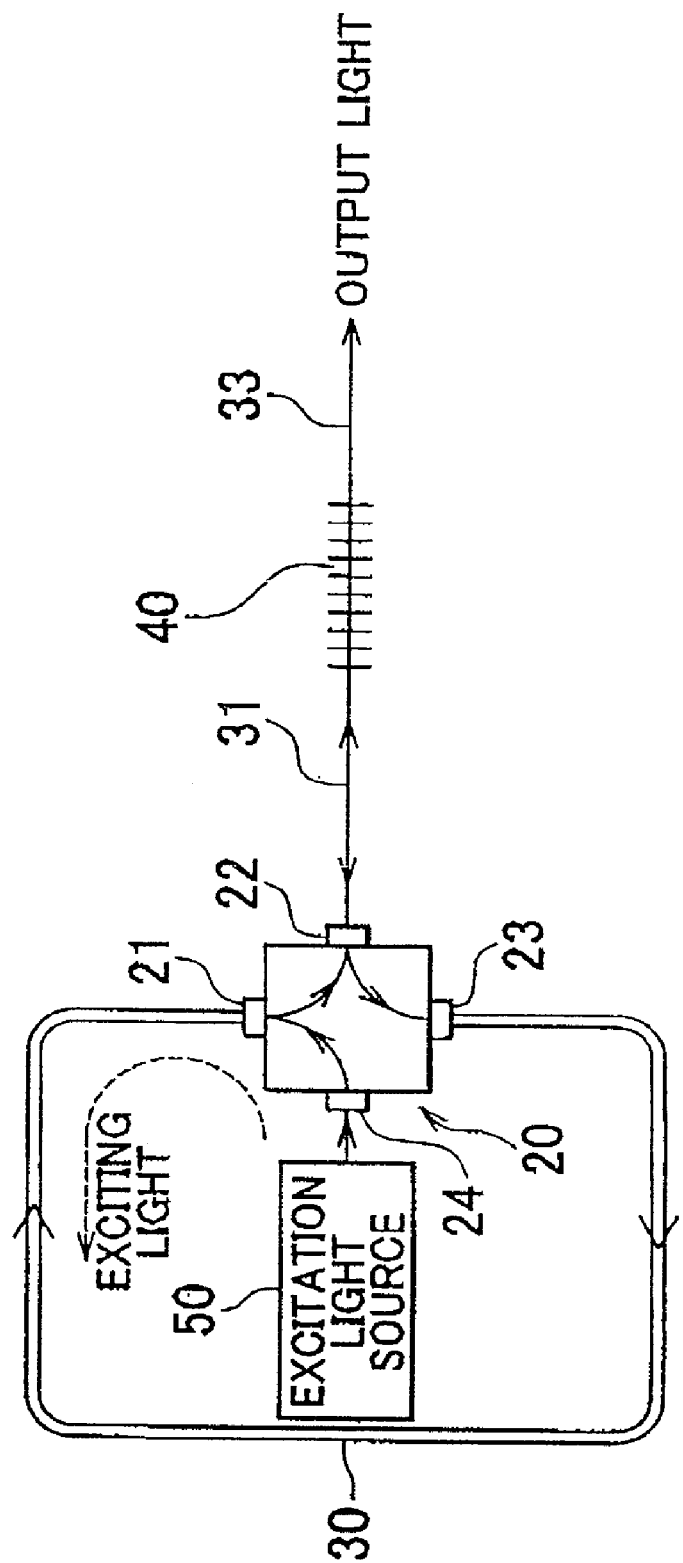
FIG. 4 shows a configuration of a second laser oscillator 200 according to an embodiment.

FIG. 4 shows a configuration of a second laser oscillator 200 according to an embodiment. The second laser oscillator 200 outputs a stable laser beam in the laser oscillator using an optical fiber excited by light as a gain medium. Here, the second laser oscillator 200 according to the present embodiment has the configuration and the function the same as those of the first laser oscillator 100 shown in FIG. 1, so that the description is omitted except for the difference.

The second laser oscillator 200 includes the optical circulator 20, the rear-earth optical fiber 30, the reflective light filter 40 and the excitation light source 50. The optical circulator 20 includes the first port 21, the second port 22 and the third port 23, and further includes a forth port 24 which is a light incident and exit port. In the optical circulator 20, light incident on the fourth port 24 is exited from the first port 21. Additionally, the optical circulator 20 injects an exciting light generated by the excitation light source 50 into the rear-earth optical fiber 30 through the first port 21 because of injecting the exciting light into the fourth port 24. The fourth port 24 of the optical circulator 20 in the present embodiment is an example of the exciting light provision section according to the present invention.

As described above, in the optical circulator 20, the exciting light is injected into the rear-earth optical fiber 30 through the port other than the first port 21 and the third port 23. That is, the exciting light is injected from the outside of the path of the resonator in the laser oscillator 200. Thereby the second laser oscillator 200 according to the present embodiment can reduce the number of components in the resonator and the optical loss in the resonator can be reduced, so that the effect the same as the first laser oscillator 100 can be achieved.

Here, in the first laser oscillator 100 shown in FIG. 1, the exciting light is incident on the second port. Meanwhile, in the second laser oscillator 200 shown in FIG. 4, the exciting light is incident on the fourth port. However, the exciting light may be incident on both of the second port and the fourth port at a time.

Figure 5:
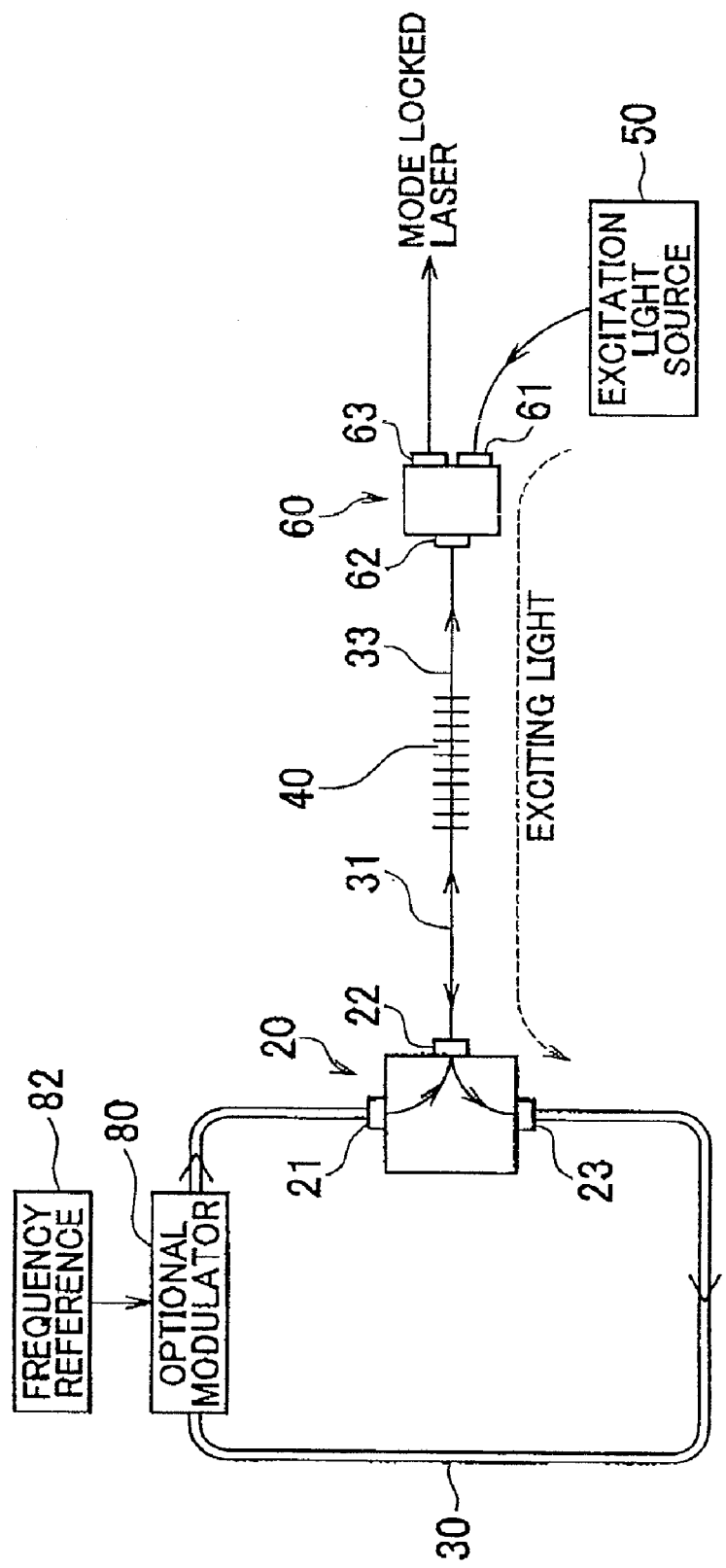
FIG. 5 shows a configuration of a first mode locked laser oscillator 300 according to an embodiment.

FIG. 5 shows a configuration of a first mode locked laser oscillator 300 according to another embodiment. Here, the components the same as those of the first laser oscillator shown in FIG. 1 have reference numerals the same as those of the first laser oscillator 100, so that the repeated description is omitted.

The first mode locked laser oscillator 300 shown in FIG. 5 has a configuration that a optical modulator 80 is inserted in the first rear-earth optical fiber 30 of the laser oscillator 100 shown in FIG. 1. The optical modulator 80 modulates the intensity or the phase of light propagated through the first rear-earth optical fiber 30 based on a predetermined reference frequency generated by a frequency reference 82. By appropriately selecting the modulation frequency, the waveform interval between the modes of the propagated light which is oscillated in multimode in the resonator is fixed, so that a sharp pulse peak each of which phase is synchronized can be generated.

As described above, the first mode locked laser oscillator 400 can reduce the cavity length, so that any mode hopping is prevented from to be generated. Accordingly, the first mode locked laser oscillator 400 can stably output the mode locked laser light with a simple configuration.

FIG. 6 shows a configuration of a first mode locked laser oscillator 301 according to a modification. Here, the components the same as those of FIG. 5 have reference numerals the same as those of FIG. 5, so that the repeated description is omitted. As shown in FIG. 6, the first mode locked laser oscillator 301 further includes the second rear-earth optical fiber 32 which is disposed between the second port 22 of the optical circulator 20 and the reflective light filter 40 and amplifies light propagated between the second port and the reflective light filter 40.

The second rear-earth optical fiber 32 is an example of the second optical amplification fiber. A path between the second port 22 of the optical circulator 20 and the reflective light filter 40 is a path through which an exciting light passes and is included in the path in the resonator. Accordingly, the second rear-earth optical fiber 32 contributes to amplify the propagated light as well as the above-described rear-earth optical fibers. Thereby the amplification degree by the gain medium is increased, so that the cavity length can be more reduced.

Figure 7:
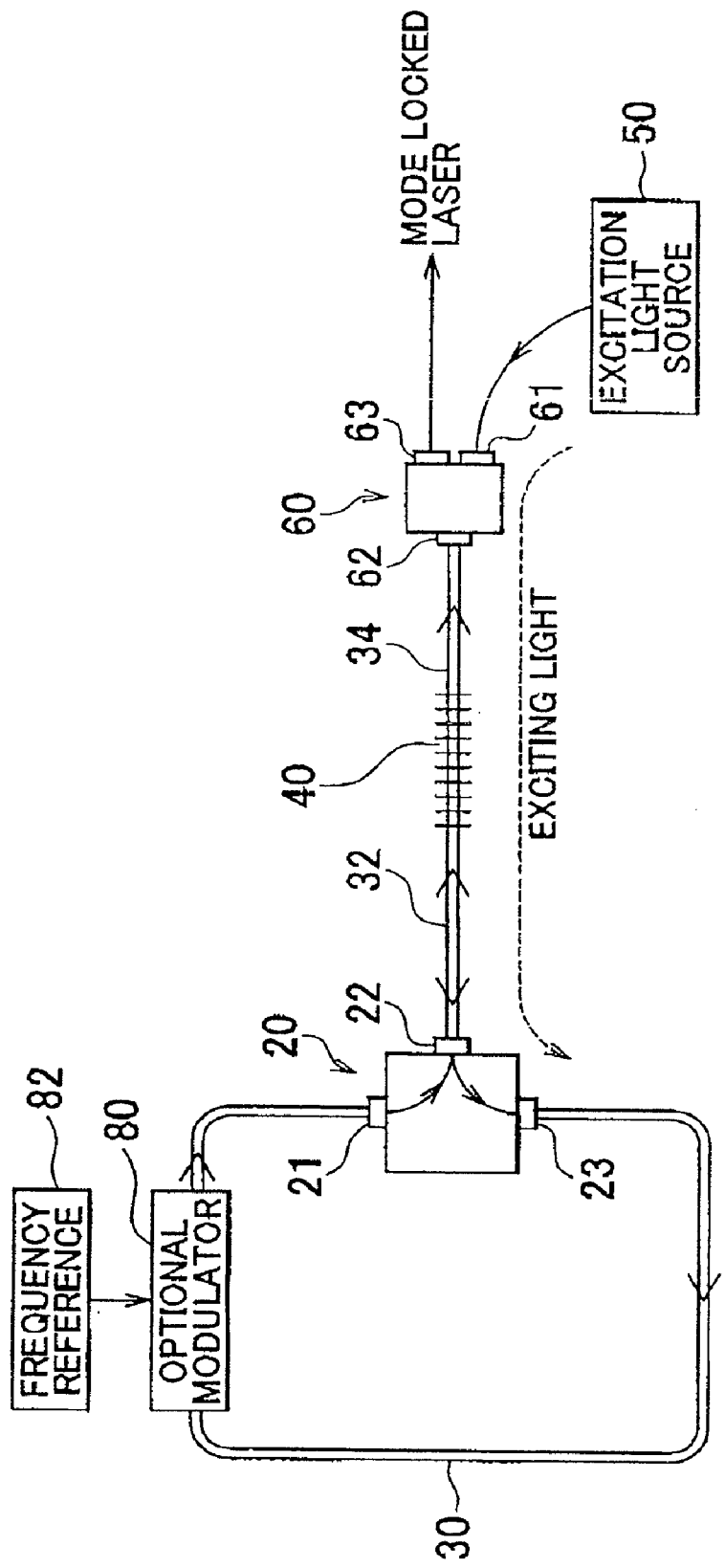
FIG. 7 shows a configuration of a first mode locked laser oscillator 302 according to another modification of the embodiment.

FIG. 7 shows a configuration of a first mode locked laser oscillator 302 according to another modification. Here, the components the same as those of FIG. 5 and FIG. 6 have reference numerals the same as those of FIG. 5 and FIG. 6, so that the repeated description omitted. As shown in FIG. 7, the first mode locked laser oscillator 302 may further include a third rear-earth optical fiber 34 which is disposed between the reflective light filter 40 and the common port 62 of the exciting/output light incident and exit section 60 and amplifies the output light propagated from the reflective light filter 40 to the common port 62. The third rear-earth optical fiber 34 is an example of the third optical amplification fiber.

A path between the reflective light filter 40 and the common port 62 of the exciting/output light incident and exit section 60 is a path through which the exciting light passes and is included in the path from which the output light is outputted. That is, the third rear-earth optical fiber 34 contributes to amplify the output light. Accordingly, the first mode clocked laser oscillator 302 can more amplify the output light and output the same.

Additionally, the reflective light filter 40 may include FBG formed by the rear-earth optical fiber in the first mode locked laser oscillator 302. Thereby the first mode locked laser oscillator 302 can more increase the amplification degree of the propagated light and amplify the output light oscillated by the laser. Further, the cavity length can be more reduced.

Figure 8:
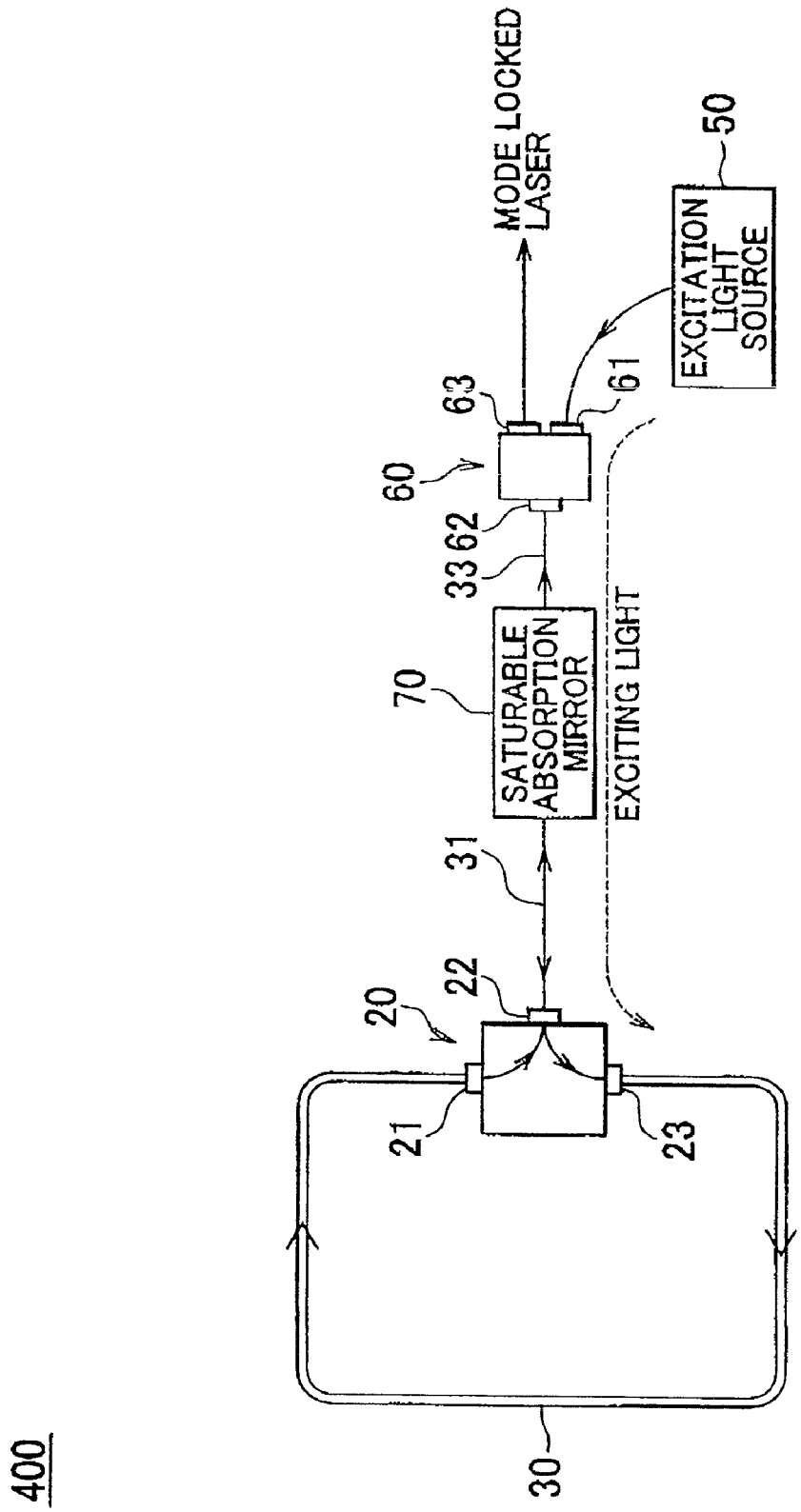
FIG. 8 shows a configuration of a second mode locked laser oscillator 400 according to another embodiment.

FIG. 8 shows a configuration of a second mode locked laser oscillator 400 according to another embodiment. Here, the components the same as those of the other Figs have reference numerals of those of the other Figs, so that the repeated description is omitted.

As shown in FIG. 8, the second mode locked laser oscillator 400 has a saturable absorption mirror 70 instead of the reflective light filter 40 in the laser oscillator shown in FIG. 1. The saturable absorption mirror 70 reflects the light incident on the second port 22 of the optical circulator 20. At this time, the absorption index of light is changed dependent on the intensity of the incident light. Specifically, the more intensity of the incident light is increased, the more absorption index of the saturable absorption mirror 70 is reduced. That is, the saturable absorption mirror 70 has saturable absorption characteristic. Additionally, when the intensity of the incident light is increased more than a certain value due to an oscillation, the saturable absorption mirror 70 transmits the light with the wavelength of the intensity increased.

Such saturable absorption mirror 70 operates such that the incident light with the large intensity is more strengthened, and the incident light with the small intensity is more deadened. Thereby the saturable absorption mirror 70 propagates an incident light on the first rear-earth optical fiber 30 when the laser light of the multimode generated in the resonator including the first rear-earth optical fiber 30 is incident thereon under the condition that each phase is synchronized at a certain timing with a high intensity. Thus, an optical pulse having a significantly sharp peak can be generated. Accordingly, both ends of the resonator including the first rear-earth optical fiber 30 can be formed, and the pulses each of which phase is synchronized at a regular intervals for the light of the multimode propagated in the resonator can be exited through the optical fiber 33.

As described above, the second mode locked laser oscillator 400 can prevent any mode hopping from being generated because the cavity length is short. Accordingly, the second mode locked laser oscillator 400 can stably output the mode locked laser light with a compact configuration.

Figure 9:
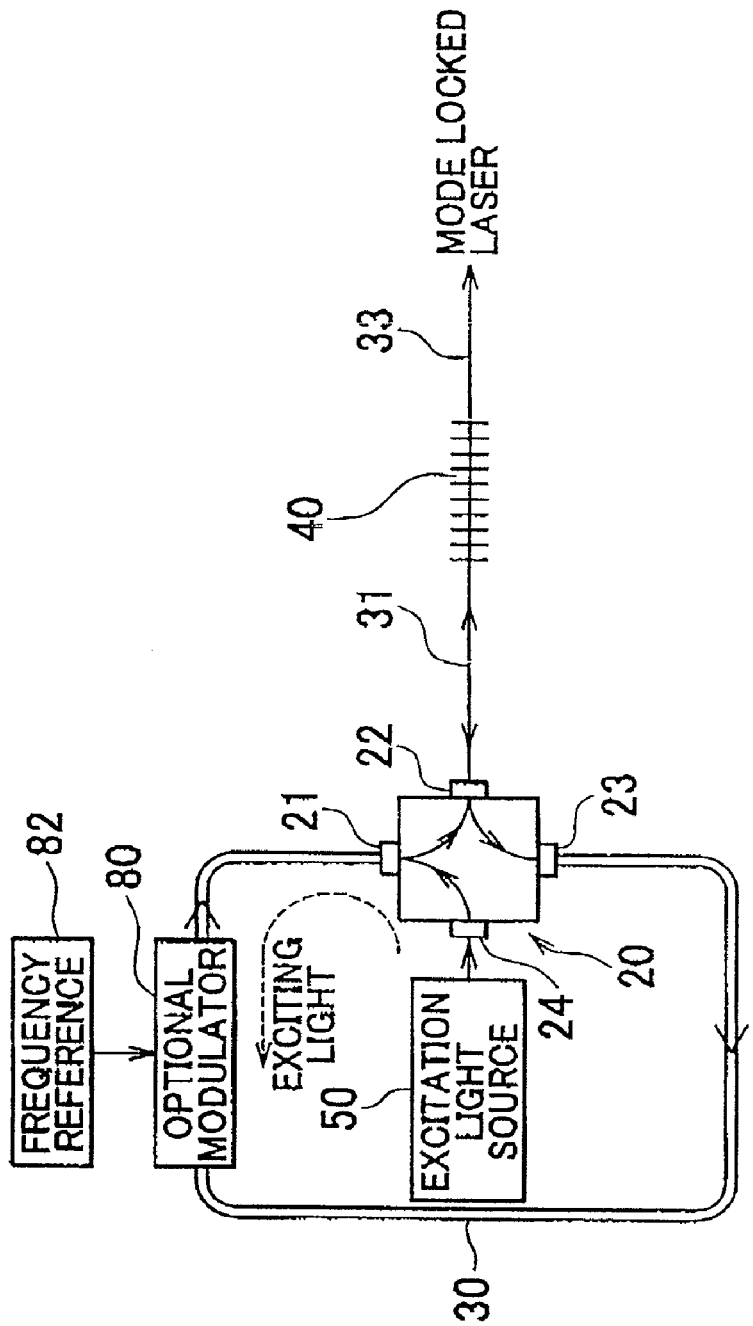
FIG. 9 shows a configuration of a third mode locked laser oscillator 500 according to another embodiment.

FIG. 9 shows a configuration of a third mode locked laser oscillator 500 according to another embodiment. Here, the third mode locked laser oscillator 600 has the configuration and the function the same as those of the second laser oscillator 200 shown in FIG. 4, so that the description is omitted except for the difference.

As shown in FIG. 9, the third mode locked laser oscillator 500 has a configuration that the optical modulator 80 is inserted in the first rear-earth optical fiber 30 of the second laser oscillator 200 shown in FIG. 4. The optical modulator 80 modulates the intensity or the phase of light propagated through the first rear-earth optical fiber 30 based on a predetermined reference frequency generated by the frequency reference 82. By appropriately selecting the modulation frequency, the wavelength intervals of the propagated light oscillated in multimode are fixed, so that sharp pulse peaks each of which phase is synchronized can be generated.

As described above, the third mode locked laser oscillator 500 can reduce the loss therein and efficiently generate laser light with a simple configuration. Additionally, the third mode locked laser oscillator 500 can prevent any mode hopping from being generated by reducing the cavity length. Accordingly, the third mode locked laser oscillator 500 can stably output a mode locked laser light with a compact configuration.

Figure 10:
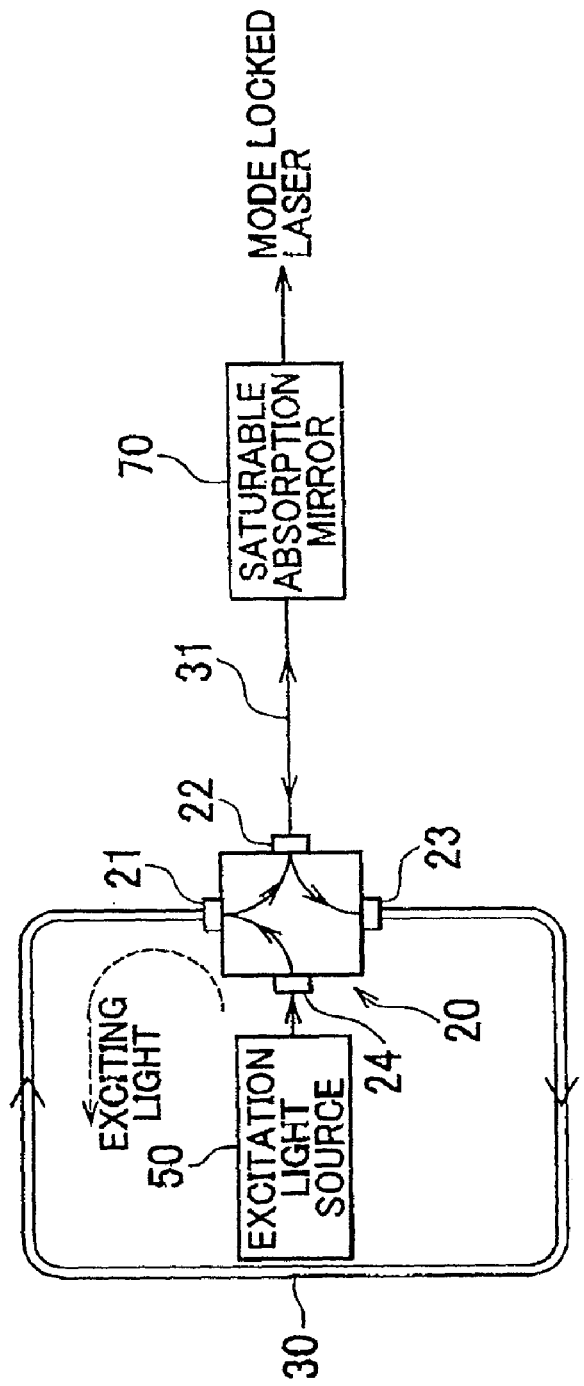
FIG. 10 shows a configuration of a fourth mode locked laser oscillator 600 according to an embodiment.
Figure 11:
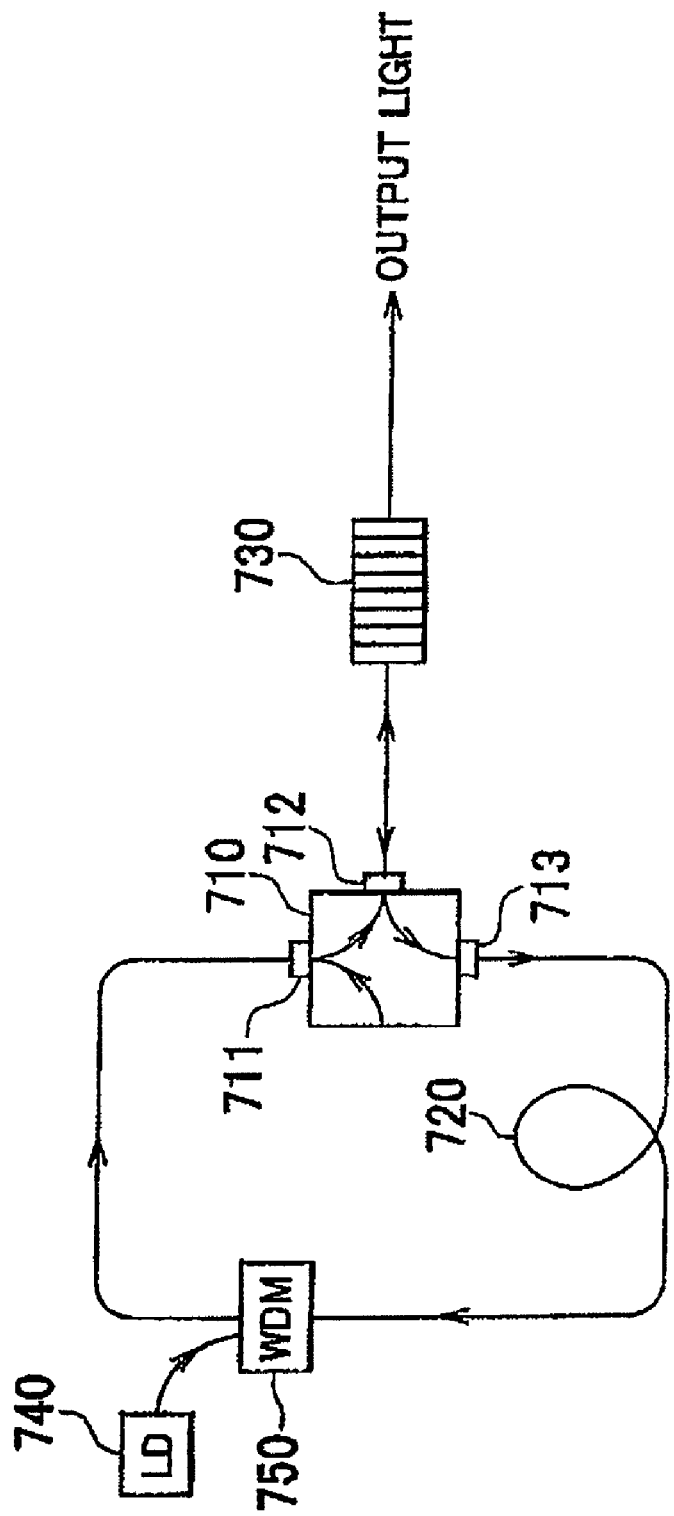
FIG. 11 shows a configuration of a conventional optical fiber laser oscillator 700.

FIG. 10 shows a configuration of a fourth mode locked laser oscillator 600 according to another embodiment. The fourth mode locked laser oscillator 600 employs an optical fiber excited by light and outputs a stable mode locked laser light. Here, the fourth mode locked laser oscillator 600 has the configuration and the function the same as those of the second laser oscillator 200 shown in FIG. 4, so that the description is omitted except for the difference.

The fourth mode locked laser oscillator 600 includes a saturable absorption mirror 70. The saturable absorption mirror 70 reflects light incident on the second port 22 of the optical circulator 20. At this time, the optical absorption index is changed dependent on the intensity of the incident light. Specifically, the more intensity of the incident light is increased, the more absorption index of the saturable absorption mirror 70 is reduced. That is, the saturable absorption mirror 70 has saturable absorption characteristic. Additionally, when the intensity of the incident light thereon is more than a certain value due to an oscillation, the saturable absorption mirror 70 transmits the light with wavelength of the intensity increased.

Such saturable absorption mirror 70 operates such that the incident light with a high intensity is more strengthened and the incident light with a low intensity is more deadened. Accordingly, for the light of a multimode propagated through the resonator, the saturable absorption mirror 70 strengthens the light incident thereon at a timing at which the phases are synchronized and deadens the light incident thereon at the other timing. Therefore, the light of a multimode of which phases are synchronized at a regular intervals As described above, the fourth mode locked laser oscillator 600 can output a mode locked laser light which is a laser light of the multiple mode in which there is a certain phase relationship between each mode. Additionally, in the fourth mode locked laser oscillator 600, an exciting light is incident on the fourth port 24 outside of the path of the resonator as well as the second laser oscillator 200. Thereby the fourth mode locked laser oscillator 600 can reduce the number of components in the resonator and reduce the optical loss in the resonator. Therefore, the fourth mode locked laser oscillator 600 can achieve an effect the same as that of the second laser oscillator 200.

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

According to the present invention, an exciting light is injected from the outside of the ring resonator, so that the loss in the ring resonator can be reduced. Additionally, according to the present invention, the threshold value of laser oscillation is reduced, and the length of an optical amplification fiber such as an EDF required for a laser oscillation can be reduced. Further, according to the present invention, the cavity length can be reduced by the physical length of such as an excitation light source and an output coupler.

According to the present invention as described above, the cavity length can be reduced, so that the range of the temperature for which the operation is stable without mode hopping can be extended.

What is claimed is:

1. A laser oscillator comprising:
   a ring resonator, which comprises:
      an optical circulator including first, second, third, and fourth ports, light incident on the first port being exited from the second port, light incident on the second port being exited from the third port, and the fourth port providing an exciting light and injecting the exciting light into the ring resonator through the first port; and
      a first optical amplification fiber connected to said optical circulator, said first optical amplification fiber amplifying light exited from the third port with the exciting light provided by said fourth port; and
   an optical member connected to said optical circulator, said optical member reflecting at least a part of the light exited from the second port and injecting the same into the second port again.

2. The laser oscillator as set forth in claim 1, wherein said optical member comprises a reflective optical filter that reflects light with a predetermined wave length.

3. The laser oscillator as set forth in claim 1, wherein said optical member comprises a saturable absorber mirror that changes a reflective index dependent on the intensity of the light exited from the second port.

4. The laser oscillator as set forth in claim 1, further comprising an optical modulator that modulates the intensity of light propagated through the first optical amplification fiber based on a reference frequency supplied from the outside of the optical fiber.

5. The laser oscillator as set forth in claim 1, wherein said optical member comprises a reflective optical filter that reflects light with a predetermined wavelength among the light exited from the second port.

6. The laser oscillator as set forth in claim 1, further comprising an excitation light source which generates and supplies the exciting light to said fourth port of said optical circulator.

7. The laser oscillator as set forth in claim 1, wherein the exciting light is incident on both of the second port and the fourth port simultaneously.

* * * * *